United States Patent [19]

Siligoni et al.

[11] Patent Number: 4,507,525
[45] Date of Patent: Mar. 26, 1985

[54] TRANSISTORIZED BRIDGE RECTIFIER CIRCUIT WITH OVERCURRENT PROTECTION FOR USE IN TELEPHONES

[75] Inventors: Marco Siligoni; Nazzareno Rossetti, both of Milan, Italy

[73] Assignee: SGS-Ates Componenti Elettronici SpA, Milan, Italy

[21] Appl. No.: 460,874

[22] Filed: Jan. 25, 1983

[30] Foreign Application Priority Data

Jan. 29, 1982 [IT]  Italy .............................. 19356 A/82

[51] Int. Cl.$^3$ ............................................. H04M 1/74
[52] U.S. Cl. ................................. 179/81 R; 179/184; 361/98; 363/127
[58] Field of Search ............. 179/70, 77, 81 R, 81 A, 179/184; 323/289, 223; 363/127; 330/207 P, 298; 361/88, 98

[56] References Cited

U.S. PATENT DOCUMENTS

| 3,434,034 | 3/1969 | Garber et al. | 363/127 |
| 3,665,330 | 5/1972 | Tharmaratnam | 330/207 P X |
| 4,016,457 | 4/1977 | Frait | 361/88 X |

FOREIGN PATENT DOCUMENTS

| 2834894 | 2/1980 | Fed. Rep. of Germany | 323/223 |
| 529989 | 11/1977 | Switzerland | 179/77 |
| 2102248 | 1/1983 | United Kingdom . | |

*Primary Examiner*—Keith E. George
*Attorney, Agent, or Firm*—Wenderoth, Lind & Ponack

[57] ABSTRACT

A transistorized bridge rectifier circuit with overcurrent protection which can be integrated monolithically is used for joining to a two-wire telephone line to the electronic circuits of a telephone subscriber set connected thereto. The circuit includes a transistorized bridge having a circuit arranged in the manner of a Graetz bridge. Rather than using separate elements for overcurrent protection, the circuit uses the bridge circuit elements themselves as protection elements. Diodes or diode connected transistors are respectively connected between the base and collector of transistors in two arms of the Graetz bridge and the resultant circuit thus provides overcurrent protection without the need of additional protection elements.

29 Claims, 5 Drawing Figures

TRANSISTORIZED BRIDGE RECTIFIER CIRCUIT WITH OVERCURRENT PROTECTION FOR USE IN TELEPHONES

BACKGROUND OF THE INVENTION

The present invention relates to bridge rectifiers for use in telephones, more particularly to a transistorized bridge rectifier with overcurrent protection capable of being integrated monolithically and used to join the electronic circuits of a telephone subscriber set to a two-wire telephone line and having a low supply voltage.

In order for the electronic circuits of telephone sets to function properly, there must be applied to the terminals thereof a supply voltage having a prespecified and constant polarity and a value ranging between restricted and precise limits.

The polarity of the terminal voltage of a two-wire telephone transmission line is not prefixed, since during maintenance operations or repairs accidental polarity reversals may occur. Therefore, the electronic circuits of telephone sets must be joined to the two-wire telephone line by means of a circuit adapted to rectify the terminal line voltage when its polarity is reversed with respect to the required polarity.

In the event of an overcurrent on the line, regardless of how it is determined, the consequent voltage drop across the circuit can be detrimental to the electronic circuit connected thereto. To prevent that from happening, it is advisable to provide overcurrent protection.

The most widely used transistorized rectifier circuits are those using a "Graetz bridge" circuit arrangement which, with the addition of a limited number of components, can also protect the electronic circuits connected thereto from the effects of overcurrents on the line.

A bridge rectifier of known construction, as shown in FIG. 1, consists of a bridge structure comprising first and second bipolar p-n-p transistors, denoted by T1 and T2, and third and fourth n-p-n transistors, indicated by T3 and T4. The collector of T1 is connected to the collector of T2, and the collector of T3 is connected to the collector of T4, said connections respectively forming a first terminal denoted by the "+" sign, and a second terminal indicated by the "−" sign, to which connections the telephone circuit C which is to be energized is coupled.

The emitter of T1 and that of T3 are connected to the T-wire (tip wire) of a two-wire telephone line, the emitter of T2 and that of T4 being connected to the R-wire (ring wire) of the same telephone line.

The base of T1 and that of T3 are respectively connected to the R-wire of the line through a resistor R1 and a resistor R3; the base of T2 and that of T4 are respectively connected to the T-wire of the line through a resistor R2 and a resistor R4. These resistors serve to properly bias the bridge transistors which, under normal service conditions, operate at saturation. The second terminal "−" is also connected to the anodes of first and of second Zener diodes Z3 and Z4, whose cathodes are respectively connected to the T-wire and R-wire of the line. For a given polarity of the line, only the p-n-p transistor whose emitter is connected to the terminal of the line at a higher potential and the n-p-n transistor whose emitter is connected to the terminal at a lower potential are in a conducting state. The other two transistors are in a non-conducting state. Therefore, the supply current of the telephone circuit C, independently of the effective polarity of the line, always flows through the circuit from the terminal formed by the connection between the collectors of the two p-n-p transistors to the terminal formed by the connection between the collectors of the two n-p-n transistors, and the polarity of the voltage between the two terminals is constant.

A possible overcurrent in the line determines an increase in the total voltage drop across the rectifier circuit.

However, as soon as the voltage across the poles of the Zener diode whose cathode is connected to the wire of the line with a higher potential equals the breakdown voltage $V_Z$ of the junction of the diode, the Zener diode is switched to the reverse conducting state by the Zener effect. The other Zener diode, instead, starts to conduct as a normal diode as soon as the voltage across its poles is equal to the threshold voltage $V_{ONZ}$ with respect to forward conduction. Therefore, the total voltage drop across the rectifier circuit does not exceed the maximum value:

$$V_{R\,MAX} = V_Z + V_{ONZ}$$

when overcurrents occur on the line.

The maximum voltage applied to the electronic telephone circuit does not exceed the maximum value:

$$V_{C\,MAX} = V_Z - V_{CE\,sat}$$

wherein $V_{CE\,sat}$ is the collector-emitter saturation voltage of a p-n-p bridge transistor.

Both the rectifier circuit and the telephone circuit are thus protected against overcurrents.

However, a rectifier circuit of the type described hereinabove, with overcurrent protection, is not the best solution from the economic point of view.

Indeed, the introduction of supplementary circuit elements, such as the two Zener diodes, in addition to those of the bridge, means an increase in the "cost" of the circuit (whether realized with discrete components or integrated monolithically) for reasons of space, well known to workers in the art, reserved for integration and processing technology.

SUMMARY OF THE INVENTION

The object of the present invention is to provide a transistorized bridge rectifier circuit with overcurrent protection that can be integrated monolithically and can be used for connecting the electronic circuits of a telephone subscriber set to a two-wire telephone line with a low supply voltage, and which is more economical to fabricate than conventional rectifier circuits with overcurrent protection.

This object is achieved by the transistorized bridge rectifier circuit with overcurrent protection as defined and characterized in the claims at the end of this description.

BRIEF DESCRIPTION OF THE DRAWINGS

The invention will be better understood from the consideration of the ensuing description offered by way of non-limitative example, and from the accompanying drawings, wherein:

FIGS. 2' and 3' are identical to FIGS. 2 and 3 except for diodes being substituted for the diode connected transistors.

DESCRIPTION OF THE PREFERRED EMBODIMENTS

In the various drawings, like parts are denoted by like signs. The diagram of a rectifier circuit with overcurrent protection according to the invention, shown in FIG. 2, comprises a transistorized bridge circuit arrangement consisting of a pair of bipolar p-n-p transistors denoted by the symbols T1 and T2 and a pair of n-p-n bipolar transistors T3 and T4. The collector of T1 is connected to that of T2, and the collector of T3 is connected to that of T4, said connections respectively forming a first terminal indicated by the "+" sign, and a second terminal indicated by the "−" sign, to which connections is coupled the electronic circuit C of the telephone set which is to be coupled to the line.

The emitters of T1 and T3 are connected to a first wire (T) of the two-wire telephone line; the emitters of T2 and T4 are connected to the second wire (R) of the line.

The bases of T1 and T3 are respectively connected to the R-wire of the line through a resistor R1 and a resistor R3; the bases of T2 and T4 are respectively connected to the T-wire of the line through a resistor R2 and a resistor R4. The base of T3 is also connected to the emitter of a bipolar n-p-n transistor T13, whose base and collector are connected to the collector of T3.

Figure 3:
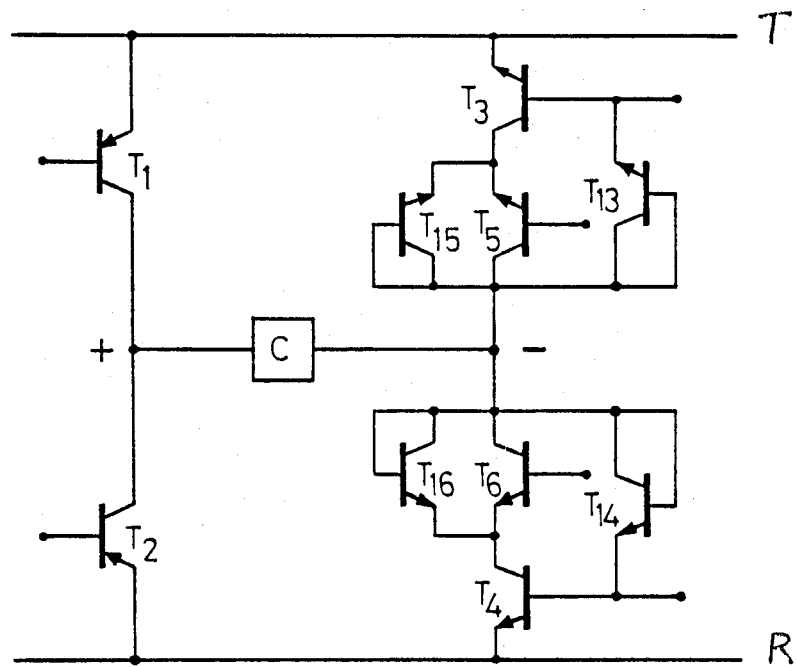
FIG. 3 is the circuit diagram of a different embodiment of the invention.
Figure 3:
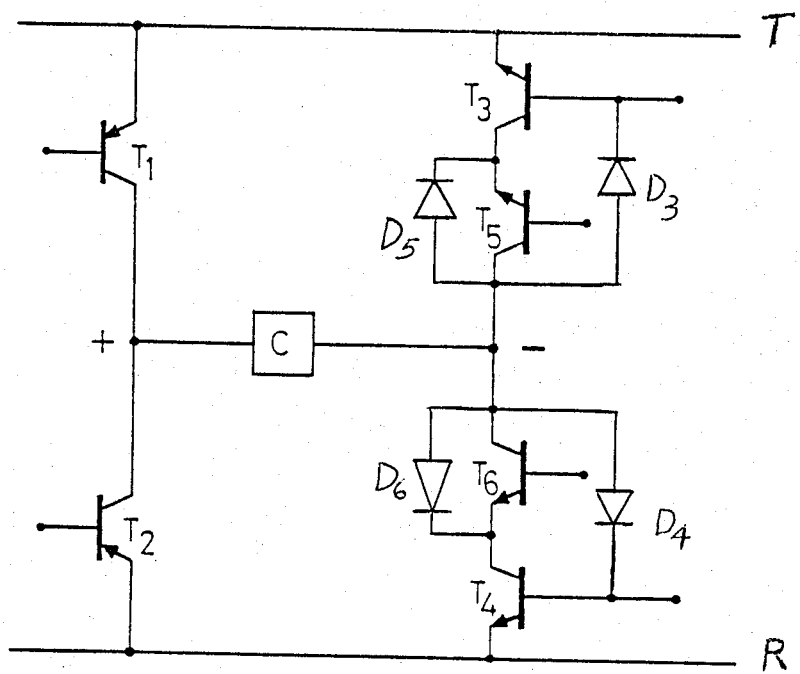

The base of T4 is also connected to the emitter of a bipolar n-p-n transistor T14, whose base and collector are connected to the collector of T4;

FIG. 3 shows the circuit diagram of a different mode of operation of the invention, comprising a pair of bipolar p-n-p transistors T1 and T2, and two pairs of bipolar n-p-n transistors T3 and T5, and T4 and T6.

The collector of T1 is connected to that of T2, and the collector of T5 is connected to that of T6, said connections constituting, respectively, a first terminal indicated by the "+" sign, and a second terminal indicated by the "−" sign, to which connections is linked the electronic circuit C of the telephone set to be coupled to the line.

The emitters of T5 and T6 are respectively connected to the collectors of T3 and T4.

The emitter of T1 and that of T3 are connected to a first wire (T) of the two-wire telephone line; the emitters of T2 and T4 are connected to the second wire (R) of the line.

The figure does not show how the circuit is biased, such biasing being effected in a manner well known to those skilled in the art; the biasing circuitry is, of course, connected to the bases of the transistors T1, T2, T3, T4, T5 and T6.

The circuit in FIG. 3 includes two pairs of bipolar n-p-n transistors T13 and T15, and T14 and T16.

The emitters of T13 and T15 are respectively connected to the base and collector of T3. The emitters of T14 and T16 are respectively connected to the base and collector of T4. The bases and the collectors of T13 and T15 are connected to the collector of T5. The bases and the collectors of T14 and T16 are connected to the collector of T6.

Figure 2:
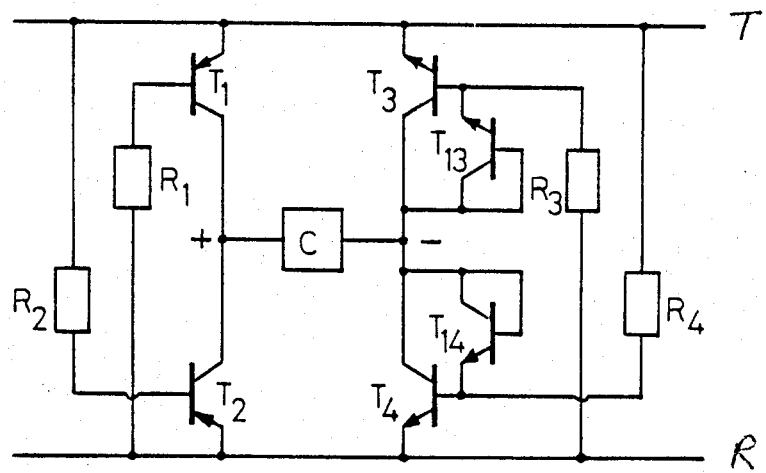
FIG. 2 is the diagram of a bridge rectifier circuit with overcurrent protection embodying the invention.
Figure 2:
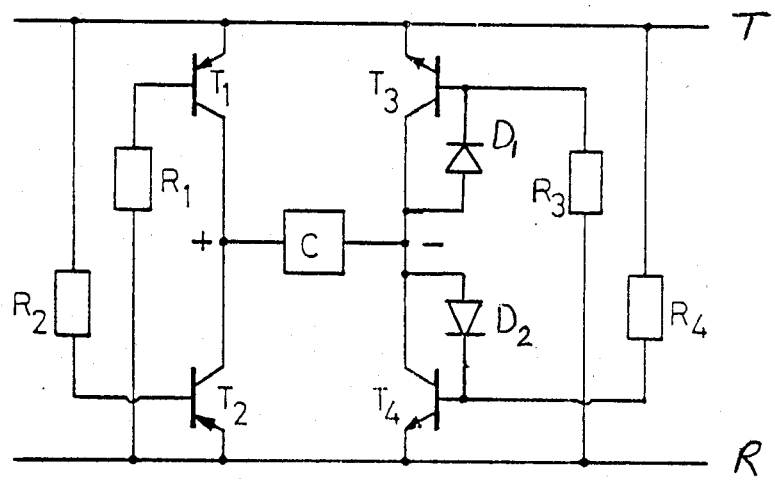

Let us now examine in detail the operation of the circuit shown in FIG. 2.

Under normal operating conditions, T1 and T4 or T2 and T3 are conductive dependent upon the polarity of the line and the conductive transistors operate at saturation; T13 and T14 (which are reverse biased) are switched off.

A possible overcurrent on the line determines an increase in the total voltage drop across the rectifier circuit. Assuming that the polarity of the terminal line voltage is such that under normal conditions T1 and T4 are saturated and T2 and T3 do not conduct, as soon as the value of the emitter-collector voltage of T3, through the effect of the overcurrent, is equal to the emitter-collector breakdown voltage, with the base open, $BV_{ECO\ T3}$, T3 becomes reverse biased; T13, which is reverse biased due to the base collector voltage of T3, is turned off.

Following breakdown, T3 can also conduct much higher currents without increasing its collector-emitter voltage, so that the voltage across the poles of the electronic telephone circuit connected to the bridge does not exceed the maximum value:

$$V_{C\ MAX} = BV_{ECO\ T3} - V_{CE\ sat\ T1}$$

where $V_{CE\ sat\ T1}$ is the collector-emitter saturation voltage of T1.

All the current from T1 and T3 flows through the collector of T4 which, if the proper base bias conditions remain unchanged, leaves its saturation state and starts to conduct in its active region; the collector-emitter voltage of T4 increases with the rise of the current flowing through its collector; when its value is equal to the sum of the base-emitter voltage of T4, $V_{BE\ T4}$, and the threshold voltage $V_{BE\ T14}$ with respect to the conduction of the base-emitter junction of transistor T14, the transistor T14, starts to conduct and supplies base current to T4, which can increase its conduction current without further increasing the collector-emitter voltage.

Therefore, the total voltage drop across the rectifier bridge does not exceed the maximum value:

$$V_{R\ MAX} = BV_{ECO\ T3} + V_{BE\ T4} + V_{BE\ T14}$$

Thus, both the rectifier circuit and the telephone circuit are protected against line overcurrents, using the same bridge transistors as protective power elements. The circuit operates in the same, symmetrical way when the line voltage is of opposite polarity. The value of the regulated voltage of the base $BV_{ECO}$ of transistors T3 and T4 is properly controlled with known technological means.

However, when the normal line voltage is already high and, hence, it is necessary to increase the voltage $BV_{ECO}$ of the n-p-n transistors in order that, under normal conditions, the turned-off n-p-n transistors do not conduct through reverse current breakdown, it is advisable to use 2 pairs of n-p-n cascade transistors, as shown in FIG. 3.

Figure 1:
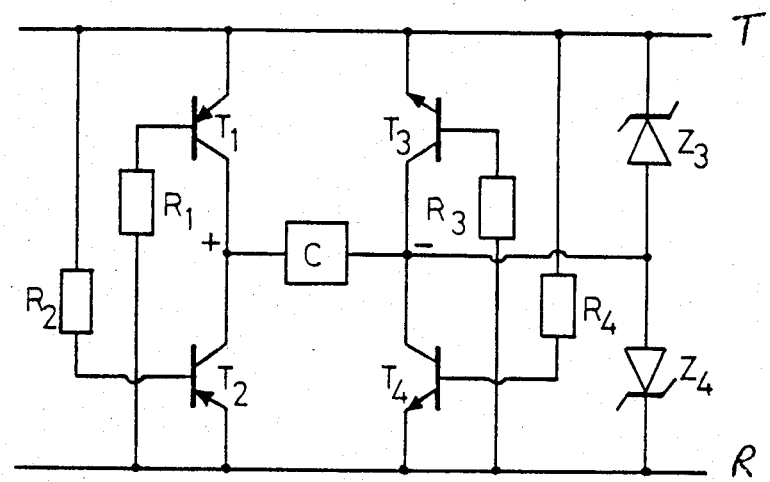
FIG. 1 is the diagram, described earlier, of a rectifier circuit of known construction with overcurrent protection.

In this case, a variation is also realized in the circuit diagram for overcurrent protection. The circuit means for biasing the bridge transistors (not shown but well known to those skilled in the art) are necessarily more complex than those of FIGS. 1 and 2.

Under normal operating conditions of the circuit shown in FIG. 3, only T1 and T4 and T6, or T2 and T3 and T5 are conductive, depending upon the line polarity. The conductive transistors operate at saturation, given the proper biasing conditions.

Assuming that the T-wire of the telephone line has a higher potential than that of the R-wire, then T1 and T4 and T6 operate at saturation. Transistors T14 and T16 are not conductive, since their collector-emitter voltage is too low for the saturation conditions of T4 and T6.

A possible overcurrent in the line determines an increase in the voltage drop across the rectifier circuit; as soon as the emitter-collector voltage of T3 and T5 is equal to the emitter-collector breakdown voltage, with the base open, of said transistors ($BV_{ECO\,T3}$ and $BV_{ECO\,T5}$), T3 and T5 become reverse-biased.

Even for very elevated currents, the voltage across the poles of the electronic telephone circuit does not exceed the maximum value:

$$VC_{MAX} = BV_{ECO\,T3} + BV_{ECO\,T5} - V_{CE\,sat\,T1}$$

where $V_{CE\,sat\,T1}$ is the collector-emitter saturation voltage of T1.

All the current from T1 and T3 and T5 flows through the collector of T6 which, if the bias conditions of the base remain unchanged, is switched from the saturation region to the active region of its field of operation.

In the active region, the collector-emitter voltage of T6 increases when the current through the collector increases until T16 is made conductive. The current through the emitters of T6 and T16 flows through the collector of T4 which, similar to T6, becomes conductive, increasing its collector-base voltage due to the current through the collector until T14 becomes conductive. Independently of T6, T4 can increase its conduction current, receiving the necessary base current from T14 in order to conduct all the current from T16 and T6 without further increases of its collector-emitter voltage.

The total voltage drop across the bridge rectifier does not exceed the maximum values $$V_{R\,MAX} = BV_{ECO\,T3} + BV_{ECO\,T5} + V_{BE\,T4} + V_{BE\,T14}$$

where $V_{BE\,T4}$ is the base-emitter voltage, in conduction, of T4 and $V_{BE\,T14}$ is that of T14.

When the line voltage is of opposite polarity, the circuit operates in a similar, symmetrical way. Thus, the embodiment of the invention shown in FIG. 3 permits overcurrent line protection both for the rectifier circuit and the telephone circuit connected thereto, using the same bridge elements as power elements for the protection.

A rectifier circuit according to the invention is particularly suitable for integration in a monolithic semi-conductor block using known integration techniques.

Transistors T13, T14, T15 and T16 are generally low-cost n-p-n transistors. Therefore, an integrated circuit according to the invention is advantageous both in terms of its fabrication and in terms of the space required for integration. The economic advantage is obvious even in an embodiment consisting of discrete components.

While we have herein shown and described two forms in which the invention may be embodied, it may readily be understood that numerous variations and modifications in the invention may be attained without departing from the spirit and scope of the novel concepts thereof. For example, p-n-p bridge transistors with a similar structure, instead of n-p-n bridge transistors, can be used as protective elements.

FIGS. 2' and 3' are identical to FIGS. 2 and 3 except for diodes $D_1$–$D_6$ being substituted for diode connected transistors $T_{13}$–$T_{16}$. Since the operation of the circuits is identical, no further discussion thereof is needed.

We claim:

1. A transistorized bridge rectifier circuit with overcurrent protection for joining an electronic circuit of a telephone subscriber set to a telephone line having first and second wires, said rectifier circuit comprising: first, second, third, and fourth elements of a bridge, each element having a first and a second terminal, said second terminal of said first element being connected to said second terminal of said second element and said second terminal of said third element being connected to said second terminal of said fourth element, said connections respectively constituting first and second coupling terminals to which is connected said electronic circuit of said telephone subscriber set; said first terminals of said first and third elements being connected to said first wire of said telephone line, and said first terminal of said second and fourth elements being connected to said second wire of said telephone line; each element of said bridge comprising at least one first bipolar transistor having its emitter and collector connected between said first and second terminals of its element, said emitter of said first transistor being connected to said first terminal of its element, said transistors of said first and second elements having a first type of conductivity which is the opposite from a second type of conductivity of the transistors of said third and fourth elements; the base of each of said transistors are connected to a control circuit means which is sensitive to the polarity of the telephone line voltage across said first and second wires and which controls the conduction of said transistors of said first and fourth elements of said bridge so as to be opposite to the conduction of said transistors of said second and third elements of said bridge, wherein a base of said first transistor of each of said third and fourth bridge elements is connected to said second terminal of its element by means of a first semiconductor element having a bipolar junction which is normally reverse-biased.

2. A rectifier circuit as set forth in claim 1, wherein said first semiconductor element having a reverse-biased bipolar junction is a diode.

3. A rectifier circuit as set forth in claim 1, wherein said first semiconductor element having a reverse-biased bipolar junction is a bipolar transistor having its base connected to its collector.

4. A rectifier circuit as set forth in claim 1, wherein each bridge element comprises only one bipolar transistor whose emitter and collector terminals respectively comprise said first and second terminals of its element.

5. A rectifier circuit as set forth in claim 2, wherein each bridge element comprises only one bipolar transistor whose emitter and collector terminals respectively comprise said first and second terminals of its element.

6. A rectifier circuit as set forth in claim 3, wherein each bridge element comprises only one bipolar transistor whose emitter and collector terminals respectively comprise said first and second terminals of its element.

7. A rectifier circuit as set forth in claim 1, wherein said third and fourth bridge elements each include a second bipolar transistor whose emitter and collector are connected between said first and second terminals of its elements, said emitter being connected to said collector of said first transistor thereof and said collector of said first transistor being connected to said second terminal of its element by means of a second semiconductor element having a normally reverse-biased bipolar junction.

8. A rectifier circuit as set forth in claim 2, wherein said third and fourth bridge elements each include a second bipolar transistor whose emitter and collector are connected between said first and second terminals of its elements, said emitter being connected to said collector of said first transistor thereof and said collector of said first. transistor being connected to said second terminal of its element by means of a second semiconductor element having a normally reverse-biased bipolar junction.

9. A rectifier circuit as set forth in claim 3, wherein said third and fourth bridge elements each include a second bipolar transistor whose emitter and collector are connected between said first and second terminals of its elements, said emitter being connected to said collector of said first transistor thereof and said collector of said first transistor being connected to said second terminal of its element by means of a second semiconductor element having a normally reverse-biased bipolar junction.

10. A rectifier circuit as set forth in claim 7, wherein said second semiconductor element having a reverse-biased bipolar junction is a diode.

11. A rectifier circuit as set forth in claim 8, wherein said second semiconductor element having a reverse-biased bipolar junction is a diode.

12. A rectifier circuit as set forth in claim 9, wherein said second semiconductor element having a reverse-biased bipolar junction is a diode.

13. A rectifier circuit as set forth in claim 7, wherein said second semiconductor element having a reverse-biased bipolar junction comprises a bipolar transistor having its base connected to its collector.

14. A rectifier circuit as set forth in claim 8, wherein said second semiconductor element having a reverse-biased bipolar junction comprises a bipolar transistor having its base connected to its collector.

15. A rectifier circuit as set forth in claim 9, wherein said second semiconductor element having a reverse-biased bipolar junction comprises a bipolar transistor having its base connected to its collector.

16. A rectifier circuit as set forth in claim 1, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

17. A rectifier circuit as set forth in claim 2, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

18. A rectifier circuit as set forth in claim 3, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

19. A rectifier circuit as set forth in claim 7, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

20. A rectifier circuit as set forth in claim 8, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

21. A rectifier circuit as set forth in claim 9, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

22. A rectifier circuit as set forth in claim 10, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

23. A rectifier circuit as set forth in claim 11, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

24. A rectifier circuit as set forth in claim 12, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

25. A rectifier circuit as set forth in claim 13, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

26. A rectifier circuit as set forth in claim 14, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

27. A rectifier circuit as set forth in claim 15, wherein said first and second bridge elements each comprise only one bipolar transistor whose emitter and collector terminals respectively constitute said first and second terminals of its element, and wherein said third and fourth bridge elements each comprise a pair of cascaded bipolar transistors, an emitter terminal of a first transistor of said cascade pair and a collector terminal of a second transistor of said cascade pair respectively constituting said first and second terminals of their element.

28. A rectifier circuit as set forth in claim 1, wherein each bipolar transistor included in said first and second bridge elements is a p-n-p type transistor and each bipolar transistor included in said third and fourth bridge elements is an n-p-n type transistor.

29. A rectifier circuit as set forth in claim 1, wherein said entire circuit is integrated in a monolithic semiconductor block.

* * * * *